United States Patent
Knight et al.

(10) Patent No.: US 6,374,187 B1
(45) Date of Patent: Apr. 16, 2002

(54) UNDERGROUND STORAGE TANK MONITORING SYSTEM AND METHOD

(75) Inventors: John D. Knight, Scarborough, ME (US); Charles Grempler, Saverna Park, MD (US)

(73) Assignee: Simmons Sirvey Corp., Richardson, TX (US)

(*) Notice: Subject to any disclaimer, the term of this patent is extended or adjusted under 35 U.S.C. 154(b) by 0 days.

(21) Appl. No.: 09/272,790

(22) Filed: Mar. 19, 1999

(51) Int. Cl.⁷ .............................................. G01F 17/00
(52) U.S. Cl. ........................... 702/51; 73/49.2; 73/149; 73/290 V; 156/171; 324/684; 340/521; 340/604; 340/605; 340/624; 702/50
(58) Field of Search ....................... 73/861.25–861.27; 702/51, 55; 340/603, 612, 618, 621

(56) References Cited

U.S. PATENT DOCUMENTS

| | | | |
|---|---|---|---|
| 4,459,584 A | * | 7/1984 | Clarkson .................... 340/624 |
| 4,835,552 A | * | 5/1989 | Andrejasich et al. ....... 340/521 |
| 4,852,054 A | | 7/1989 | Mastandrea |
| 5,075,877 A | | 12/1991 | Jacob et al. |
| 5,297,423 A | | 3/1994 | Keating et al. |
| 5,363,093 A | | 11/1994 | Williams |
| 5,400,253 A | | 3/1995 | O'Connor |
| 5,471,867 A | | 12/1995 | Tuma |
| 5,609,059 A | | 3/1997 | McEwan |
| 5,610,611 A | | 3/1997 | McEwan |
| 5,757,664 A | | 5/1998 | Rogers |
| 6,012,020 A | * | 1/2000 | Gardell et al. ................ 702/50 |

* cited by examiner

*Primary Examiner*—Arthur T. Grimley
*Assistant Examiner*—John Le
(74) *Attorney, Agent, or Firm*—Shughart Thomson & Kilroy P.C.

(57) ABSTRACT

An underground storage tank monitoring system and method uses special micropower impulse radar probes, with one such probe being inserted into each storage tank. The micropower impulse radar probes use flexible waveguides which extend downward to the tank bottom such that micropower radar impulses travel to and from the liquid surface via a wave guide, with the lapse between emission and reception of the impulse indicating a distance from the probe, and thus a liquid level. Each micropower impulse radar probe is connected to a dedicated spread spectrum transmitter which collects level and status information from the probe, encodes and transmits it to a matching spread spectrum receiver nearby. The receiver converts the coded signals into electrical signals and forwards them to a processor, a modem and a back-up battery are located. The processor stores the liquid level information for later transmission, along with liquid dispensed and liquid replaced information, to a central monitoring site via the modem.

14 Claims, 3 Drawing Sheets

UNDERGROUND STORAGE TANK MONITORING SYSTEM AND METHOD

FIELD OF THE INVENTION

The present invention relates to a system and method for monitoring underground storage tanks, and, more particularly, to such a system and method in which a number of underground fuel storage tanks, such as in gasoline service stations spread over a wide geographic area, are all monitored from a central location.

BACKGROUND OF THE INVENTION

Recent environmental concerns with underground fuel storage tanks have led the Environmental Protection Agency to create strict monitoring rules for gasoline service stations and other users of such tanks. Compliance with these regulations, which can require accuracy within ⅛ inch of liquid level and must detect leakage rates of as little as 0.1 gal/hr. or less, can be an expensive and time consuming activity for a small business such as a service station. In an effort to alleviate this burden, a number of companies have developed systems for monitoring underground storage tanks for leakage compliance. In addition, some of these systems use the data collected for inventory management services as well. Examples of leak detection systems are found in U.S. Pat. No. 4,852,054 to John Mastrandrea; U.S. Pat. No. 5,075,877 to Allan Jacob; U.S. Pat. No. 5,297,423 to Jerome Keating, et al.; U.S. Pat. No. 5,363,093 to Barry Williams et al.; U.S. Pat. No. 5,400,253 to Paul O'Connor: U.S. Pat. No. 5,471,867 to John Tuma et al.; and U.S. Pat. No. 5,757,664 to Warren Rogers, et al. These prior art systems all require complex liquid level sensors which are hardwired to monitoring computers on site. This presents a number of problems. Typically, installation of such liquid level sensors requires the tank top to be accessed, which means tearing up concrete or asphalt surfaces covering the tank. The cables connecting the liquid level sensors to the monitoring computer are usually run beneath the road surface, which also requires the concrete or asphalt to be cut. Such probes usually must be installed in risers other than the fill riser, which can require expensive tank modifications. Many prior art systems require the installation of additional sensors such as temperature and/or pressure probes to detect fuel temperature and internal tank pressure as variables in computing liquid volume. Finally, many prior art centralized systems require a dedicated telephone line from service station to central monitoring computer, which also adds to the expense.

It is clear, then, that an improved underground storage tank monitoring system and method is needed. Such a system and method should avoid the above-mentioned problems of the prior art and should provide reliable monitoring at an economical price.

SUMMARY OF THE INVENTION

The present invention is an underground storage tank monitoring system and method which uses a special micropower impulse radar transmitter/receiver as a liquid level probe. Technical details for the micropower impulse radar probes are found in U.S. Pat. No. 5,609,059, entitled "Electronic Multi-Purpose Material Level Sensor" and U.S. Pat. No. 5,610,611, entitled "High Accuracy Electronic Materials Level Sensor", which patents are incorporated herein by reference. One such probe is inserted into each storage tank, either through a dedicated monitor riser or, if none is available, in the existing fill riser via a special installation technique. The micropower impulse radar probes use flexible waveguides which extend downward to the tank bottom and which allow micropower radar impulses from the probe to travel down the waveguide, to reflect off of the liquid surface, and to return to the probe. The time lapse between emission and reception of the impulse by the micropower impulse radar probe is measured and a distance to the liquid surface, and thus a liquid level, can be calculated therefrom. In addition, a portion of each impulse travels through the fuel and is secondarily reflected off of the surface of any water which has accumulated in the tank. In this manner, a water level can also be calculated from the time between impulse transmission and reception of these secondary impulses. Each micropower impulse radar probe is connected to a dedicated, low power, spread spectrum transmitter which collects level and status information from the probe, encodes and transmits it to a matching spread spectrum receiver nearby, preferably within the service station building. The receiver converts the coded signals into electrical signals and forwards them to a processor, to which is connected a modem and a back-up battery power source. The processor stores the liquid level information, including fuel level and, optionally, accumulated water level, for later transmission to a central monitoring site via the modem. A data entry keyboard is also provided for entering fuel dispensed and fuel displaced information into the processor. Unlike many other systems which periodically poll the service station from the central monitoring site, the inventive system does not require a dedicated telephone line for implementation since the data transmission is initiated from the service station only during regular reporting times or when an abnormal condition occurs.

OBJECTS AND ADVANTAGES OF THE INVENTION

The objects and advantages of the invention include: providing an underground storage tank monitoring system and method; providing such an underground storage tank monitoring system and method in which a number of different underground storage tanks can be monitored efficiently from a central monitoring site; providing such an underground storage tank monitoring system and method in which a micropower impulse radar probe is inserted into each tank via a riser, connected to a spread spectrum transmitter positioned in a manhole containing the riser, which transmitter transmits liquid level information to a remote receiver; providing such an underground storage tank monitoring system and method in which a special installation system allows the micropower impulse radar probes to be inserted via the fill riser of an existing tank where no monitor riser is available; providing such an underground storage tank monitoring system and method which uses liquid levels, as measured by the micropower impulse radar probes, along with quantities of fuel dispensed from the tank and fuel replaced in the tank to calculate leak rates, and, optionally, perform inventory control; providing such an underground storage tank monitoring system and method which is particularly economical to install and implement as compared to existing systems; and providing such an underground storage tank monitoring,,system and method which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a greatly reduced, fragmentary, partially schematic view of the micropower impulse radar probe and hinge bracket installed within a tank and pivoted outward by a grooved drop tube.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
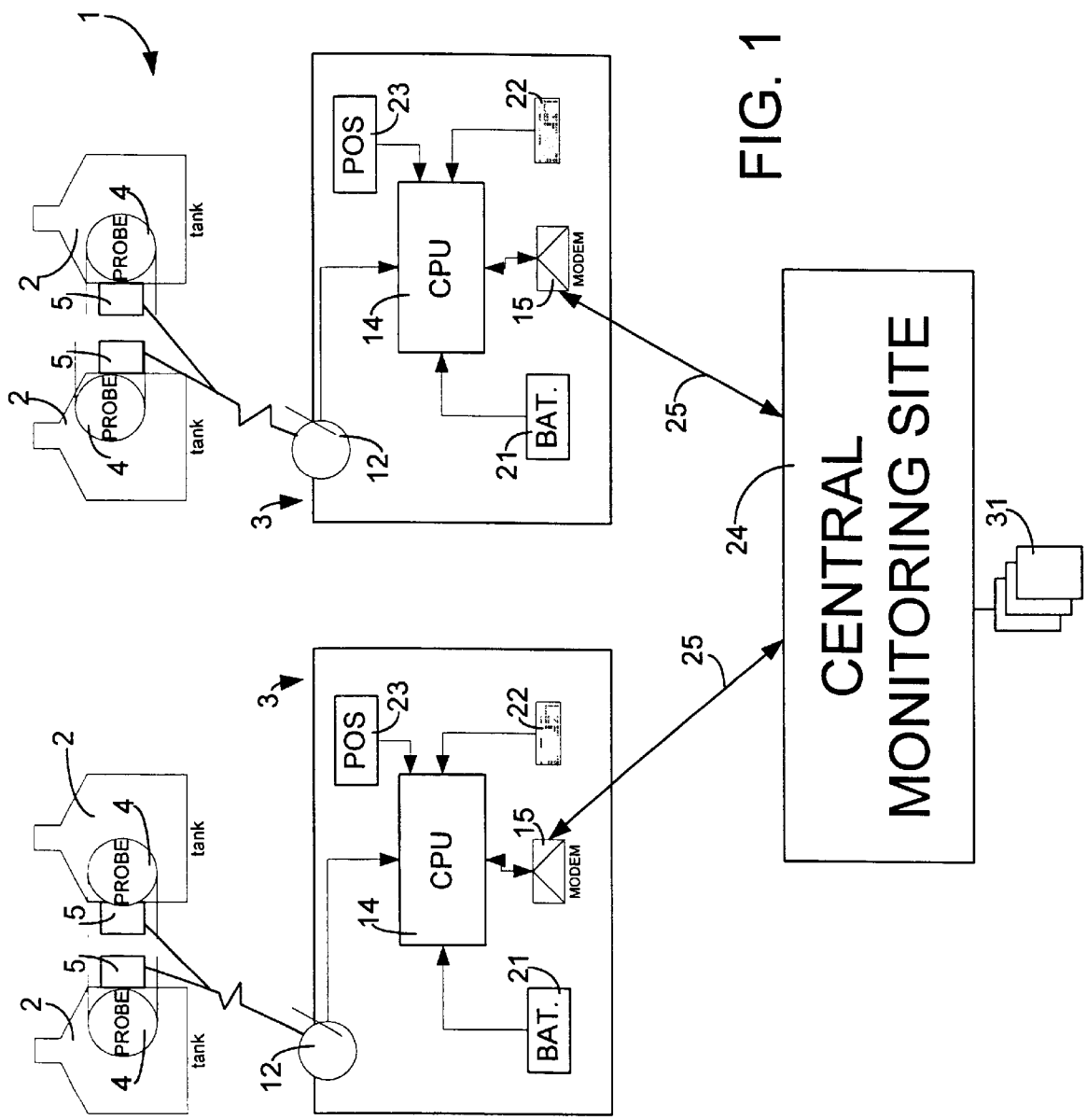
FIG. 1 is a block schematic diagram representing the inventive underground storage tank monitoring system and method.

Referring to the drawings, and particularly FIG. 1, an underground storage tank monitoring system in accordance with the present invention is illustrated in block diagram form and is generally indicated at 1. The system 1 is designed to monitor a plurality of underground storage tanks, indicated schematically at 2, at each of a number of different service stations 3. A micropower impulse radar probe 4 is placed within a respective riser connected to each of the tanks 2, in a manner described more particularly below.

A respective dedicated, low power, spread spectrum transmitter 5 is connected to each micropower impulse radar probe 4 which transmitters 5 collect fuel level and status information from their connected probes 4, and then encode and transmit it to a matching spread spectrum receiver 12 positioned nearby, preferably within a service station building (not shown). Each receiver 12 can monitor multiple transmitters 5. The receivers 12 convert the coded signals into electrical signals and forward them to a processor (CPU) 14, to which is connected a modem 15 and a back-up battery 21. An input keypad 22 and (optionally), a computerized Point of Sale (POS) system 23 are also connected to the Processor 14. The processor 14 stores the liquid level information, including fuel level and accumulated water, for each tank 2 at that service station 3. It also receives and stores data on fuel dispensed from and fuel replaced into each monitored tank 2. The fuel dispensed information can be input manually via the keypad 22 or automatically via the POS system 23. The fuel replaced must be manually input via the keyboard. The processor 14, at a predetermined time each day, then transmits the stored data to a central monitoring site 24 via the modem 15 over standard telephone lines 25. By designating a particular time each day for the processor 14 to connect to the central monitoring site 24, the inventive system 1 does not require a dedicated telephone line for implementation. In addition, if the processor 14 senses an abnormal condition, such as a high level alarm when liquid level is detected above a certain level in the tank, indicating a potential tank overflow, etc., it is programmed to connect to the central monitoring site 24 at any time of day or night to report the condition.

Figure 2:
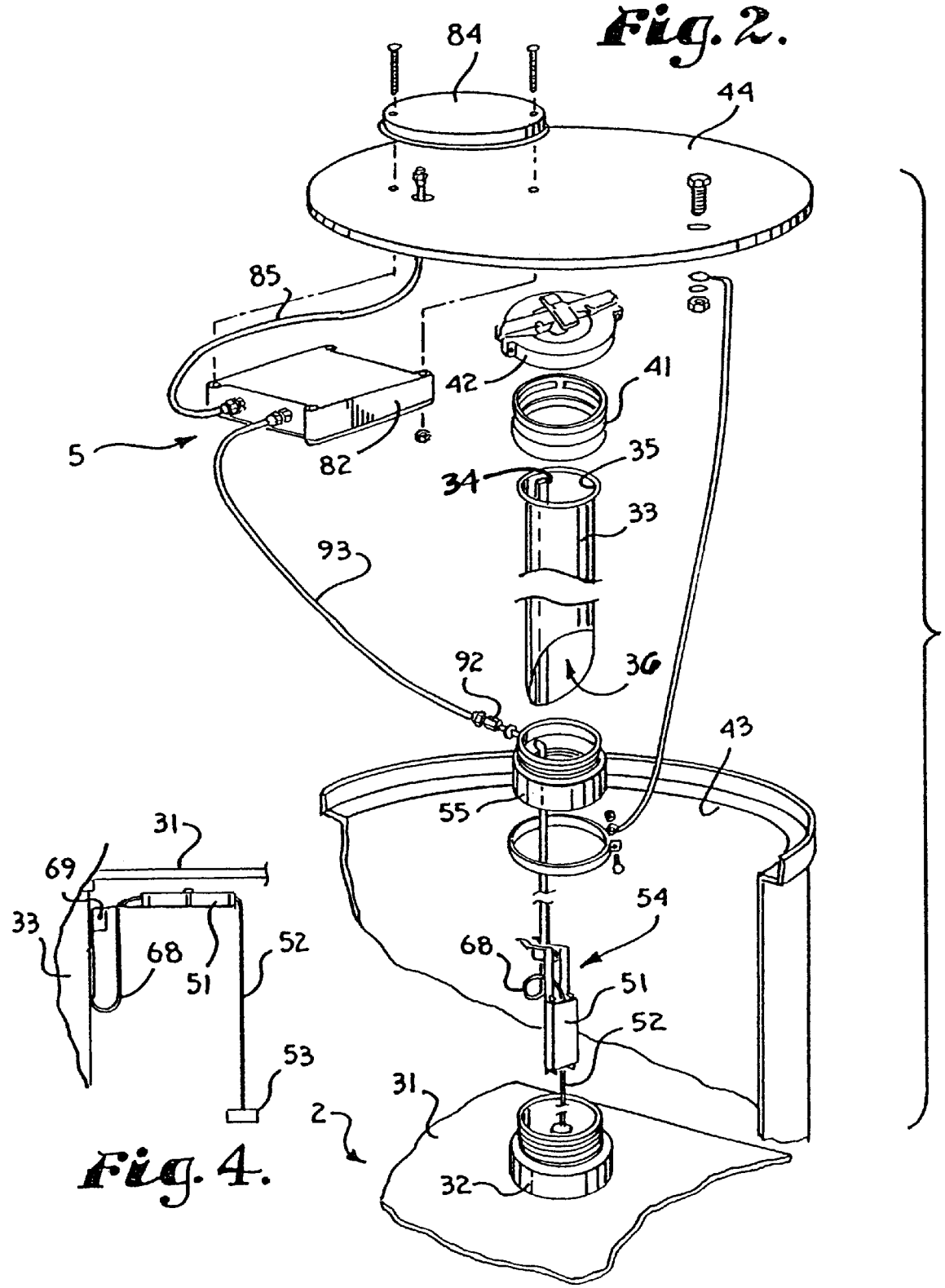
FIG. 2 is an exploded view of a micropower impulse radar probe and probe installation system for installing the inventive underground storage tank monitoring system in an existing tank via the fill riser.

Referring to FIG. 2, a portion of an upper surface 31 of one of the tanks 2 is shown with a fill riser 32 extending upward therefrom. A drop tube 33 includes an exterior groove 34 extending the length thereof, with the drop tube 33 having an open fuel inlet end 35 and a tapered open fuel outlet end 36. In a known manner, the drop tube 33 is of a length sufficient to reach from the top of the fill riser 32 to a position just above the bottom surface of the tank 2 (not shown). A drop tube adapter 41 secures the drop tube inlet end 35 to the top of the fill riser 32 and a removable fill cap 42 covers the open end of the drop tube adapter 41. The fill riser 32 is positioned within a well 43 and a well cover 44 is provided to close off the top of the well 43.

Figure 3:
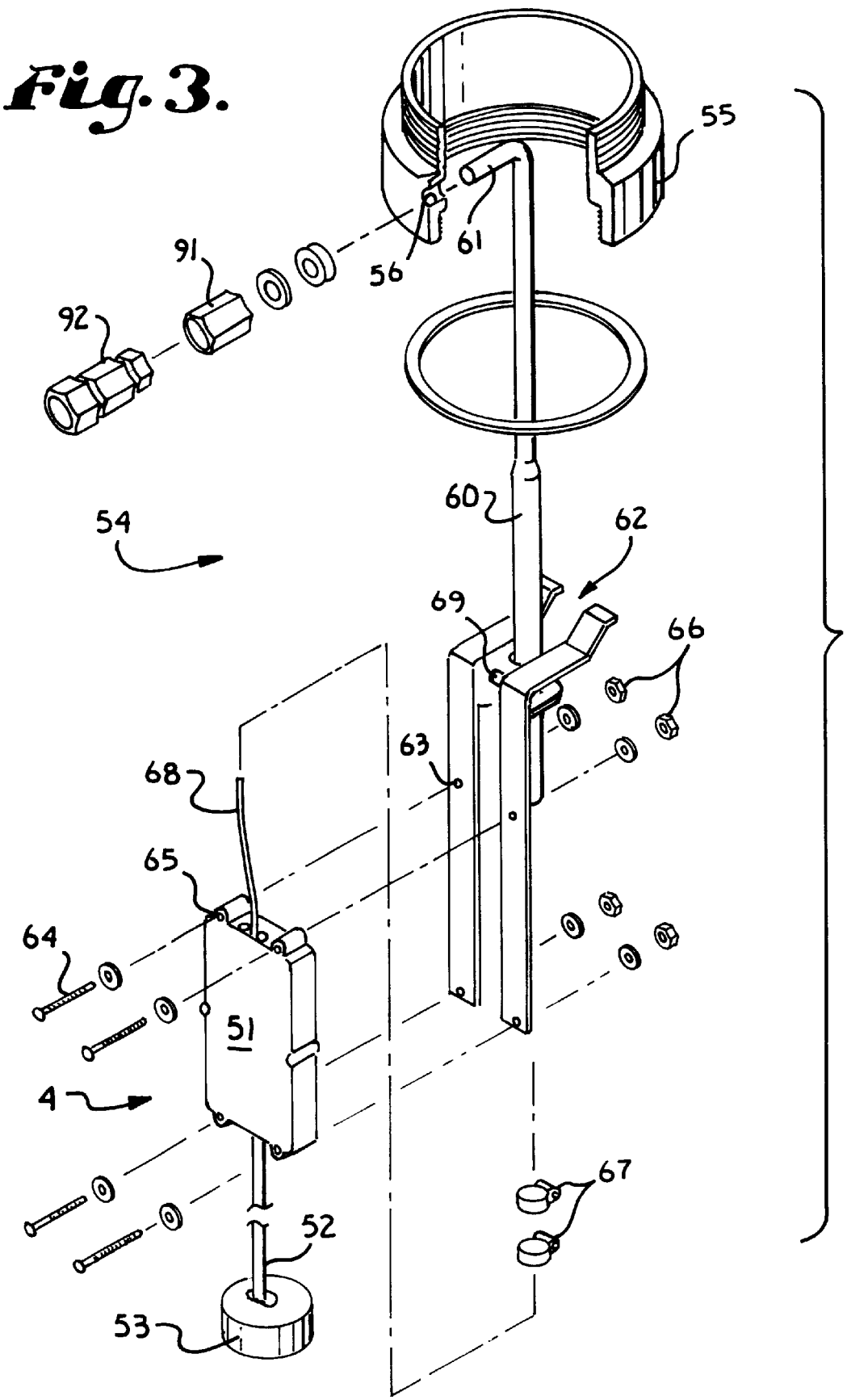
FIG. 3 is a perspective view of the micropower impulse radar probe, installation system, spread spectrum radio transmitter and disc antenna installed in an underground storage tank, with a portions of the tank broken away for illustrative purposes.

FIGS. 2–4 illustrate a micropower impulse radar probe 4 including a probe assembly 51 with an elongate waveguide 52 extending downward therefrom and terminating in a circular weight 53. A probe installation system is also illustrated and generally indicated at 54. The installation system 54 includes a riser adapter 55 with a cable routing opening 56 extending through a side wall thereof, an L shaped cable guide 60, a probe hinge bracket 62 positioned on the cable guide 60. An upper leg 61 of the cable guide 60 extends at substantially a 90 degree angle outward. The probe hinge bracket 62 includes a number of through bores 63 which accommodate respective mounting screws 64 which also extend through respective through holes 65 on the probe assembly 51 and are secured on the other side of the hinge bracket 62 via washers and nuts 66. The hinge bracket 62 slides over the cable guide 60 and is secured in place thereon via self-locking retaining rings 67. A cable 68 is connected to the probe assembly 51 for conducting signals from the probe assembly 51 to a spread spectrum transmitter 82. A hinge pin 69 allows the hinge bracket to pivot relative to the cable guide 60, as shown in FIG. 4.

FIG. 2 also illustrates the spread spectrum transmitter 5 including a transmitter assembly 82, along with a dome antenna 84. A coaxial cable 85 connects the transmitter assembly 82 to the dome antenna 84. It should be recognized that other antenna types can be used, and, if the well cover 44 is non-metallic, an antenna can be positioned within the well 43.

Referring to FIG. 2, in order to install the inventive probe and transmitter into an existing tank fill riser 32, the following steps are implemented:

1) Remove the existing fill cap, adapter and drop tube (not shown) from the fill riser 32;
2) Thread the riser adapter 55 onto the threaded fill riser 32;
3) Measure the depth of the combined fill riser 32 and riser adapter 55 to determine the appropriate length for the cable guide 60 and cut it to that length;
4) Install the probe assembly 51 onto the hinge bracket 62 via the screws 64 and washers and nuts 66;
5) slide the hinge bracket 62 with the probe assembly 51 mounted thereon, onto the cable guide 60 and secure it in place via the self-locking retaining rings 67;

6) Feed the cable 68 through the cable guide 60 from bottom to top and out an opening in the angled leg 61;
7) orient the probe hinge bracket 62 and probe 4 into alignment with the angled leg 61 of the cable guide 60 and feed the end of the exposed end of the cable 68 through the opening 56 in the side wall of the riser adapter 55 and tie it off;
8) insert the cable guide 60 along with the hinge bracket 62 and probe 4, with waveguide 52 and weight 53 into the tank fill riser 32 and insert the angled leg 61 through the opening 56 and secure it with a compression fitting 91. Connect a cable fitting 92 to the exposed end of the cable 68;
9) Install the externally grooved drop tube 33 into the tank 2 via the fill riser 32 with the groove 34 aligned with the cable guide leg 61 until the inlet opening 35 rests atop the adapter 55. With the probe hinge bracket 62 aligned as shown, the drop tube 33 will push the level probe assembly 51 outward, pivoting about the hinge pin 69 to the substantially horizontal position shown in FIG. 4, which properly orients it for liquid level sensing;
10) Install the drop tube adapter 41 onto the adapter 55 so that the cap 42 can be used thereon;
11) Drill holes in the well cover 44 and connect the cable 85 between the transmitter 81 and the antenna 84 and connect a cable 93 between the transmitter assembly 82 and the fitting 93 connected to the cable 68;
12) Attach the antenna 84 and the transmitter assembly 82 to the well cover 44; and
13) Initialize and test the probe 4 and transmitter 5.

While the underground storage tank monitoring system 1 has been illustrated and described in a preferred embodiment, numerous variations will occur to one of ordinary skill in the art. For example, the system could be used for monitoring above ground storage tanks as well. The system could also be used as a stand alone system for a single service station whereby all leak detection and monitoring for a plurality of tanks 2 is done on site. It is thus to be understood that while certain forms of the present invention have been illustrated and described herein, it is not to be limited to the specific forms or arrangement described and shown.

We claim:

1. A liquid storage tank monitoring system which monitors liquid level in a plurality of storage tanks, comprising:
   a) a plurality of micropower impulse radar probes, each of which is installed in a respective one of said tanks, each of said probes being operative to transmit micropower radar impulses toward the surface of liquid contained in their respective tank, to receive reflected micropower radar impulses returning from said liquid surface, and to calculate a liquid level information from the time lapse between transmission of the impulses and reception of the reflected impulses;
   b) a like plurality of spread spectrum transmitters and antennas, with each such transmitter being coupled to a respective one of said probes, each said transmitter receiving said liquid level information from the probe coupled thereto and being operative to encode and transmit said liquid level information;
   c) at least one spread spectrum receiver positioned in a location in which it can reliably receive and decode liquid level information transmitted by said spread spectrum transmitters and antennas; and
   d) a respective processor connected to each said receiver to receive and store said liquid level information.

2. A liquid storage tank monitoring system as in claim 1, wherein at least some of said micropower impulse radar probes are inserted into their respective tanks via a fill riser.

3. A liquid storage tank monitoring system as in claim 2, and further comprising a probe installation system for each of said micropower impulse radar probes which are inserted via the fill riser, each said installation system including:
   a) a riser adapter with a cable routing opening extending through a side wall thereof;
   b) an L shaped cable guide attached to and extending downward through said fill riser and into said tank;
   c) a probe hinge bracket positioned on the cable guide, said hinge bracket securing said micropower impulse radar probe such that it is pivotable with respect to said cable guide between a substantially vertical position required for insertion through the fill riser and a substantially horizontal, operative position; and
   d) a drop tube with an external groove extending substantially along its length, said drop tube being insertable within said fill riser with said groove accommodating said cable guide, said drop tube, upon insertion, engaging said hinge bracket and pivoting said hinge bracket and said micropower impulse radar probe from said substantially vertical position to said substantially horizontal position.

4. A liquid storage tank monitoring system as in claim 1, wherein there are a plurality of service stations, each with a plurality of storage tanks with each service station including one of said spread spectrum receivers which receives signals from transmitters located at that service station and one of said processors, said system further comprising:
   a) a central monitoring site which is connectable with each of said service station processors, said processors periodically sending liquid level information to said central monitoring site where data is compiled to enable the central monitoring site to do leak analysis on each tank.

5. A liquid storage tank monitoring system as in claim 4, wherein each of said processors includes a data entry device for inputting liquid dispensed and liquid replaced information for each tank in addition to said liquid level information, each said processor also forwarding said liquid dispensed and liquid replaced information to said central monitoring site.

6. An underground fuel storage tank monitoring system which monitors fuel levels, detects leaks and other conditions in a plurality of storage tanks located at a plurality of different fuel service stations from a central location, comprising:
   a) a plurality of micropower impulse radar probes, each of which is installed in a respective one of said tanks, each of said probes being operative to transmit micropower radar impulses toward the surface of fuel contained in their respective tank, to receive reflected micropower radar impulses returning from said fuel surface, and to calculate fuel level information from the time lapse between transmission of the impulses and reception of the reflected impulses;

b) a like plurality of spread spectrum transmitters and antennas, with each such transmitter being coupled to a respective one of said micropower impulse radar probes, each said transmitter receiving said fuel level information from the probe coupled thereto and being operative to encode and transmit said fuel level information;

c) a plurality of one spread spectrum receivers, each said receiver being positioned at a respective one of said service stations in a location in which it can reliably receive and decode fuel level information transmitted by said spread spectrum transmitters and antennas located at that service station;

d) a plurality of processors, each said processor being positioned at a respective one of said service stations and being connected to each said receiver to receive and store said fuel level information for each tank at that service station; and e) a central monitoring site which is connectable with each of said service station processors, said processors periodically sending fuel level information to said central monitoring site where data is compiled to enable the central monitoring site to do leak analysis on each tank.

7. An underground fuel storage tank monitoring system as in claim 6, wherein at least some of said micropower impulse radar probes are inserted into their respective tanks via a fill riser.

8. An underground fuel storage tank monitoring system as in claim 7, and further comprising a probe installation system for each of said micropower impulse radar probes which are inserted via the fill riser, each said installation system including:

a) a riser adapter with a cable routing opening extending through a side wall thereof;

b) an L shaped cable guide attached to and extending downward through said fill riser and into said tank;

c) a probe hinge bracket positioned on the cable guide, said hinge bracket securing said probe such that it is pivotable with respect to said cable guide between a substantially vertical position required for insertion through the fill riser and a substantially horizontal, operative position; and d) a drop tube with an external groove extending substantially along its length, said drop tube being insertable within said fill riser with said groove accommodating said cable guide, said drop tube, upon insertion, engaging said hinge bracket and pivoting said hinge bracket and said probe from said substantially vertical position to said substantially horizontal position.

9. An underground fuel storage tank monitoring system as in claim 6, wherein each of said processors includes a data entry device for inputting fuel dispensed and fuel replaced information for each tank in addition to said fuel level information, each said processor also forwarding said fuel dispensed and fuel replaced information to said central monitoring site.

10. A method of monitoring fuel levels, detecting leaks and other conditions in a plurality of storage tanks located at a plurality of different fuel service stations from a central location, comprising:

a) installing a respective fuel level micropower impulse radar probe in each of said tanks, each of said probes being operative to transmit micropower radar impulses toward the surface of fuel contained in their respective tank, to receive reflected micropower radar impulses returning from said fuel surface, and to calculate fuel level information from the time lapse between transmission of the impulses and reception of the reflected impulses;

b) positioning a like plurality of spread spectrum transmitters and antennas, with each such transmitter being coupled to a respective one of said probes, each said transmitter receiving said fuel level information from the micropower impulse radar probe coupled thereto and being operative to encode and transmit said fuel level information;

c) positioning a respective spread spectrum receiver at each one of said service stations in a location in which it can reliably receive and decode fuel level information transmitted by said spread spectrum transmitters and antennas located at that service station;

d) positioning a respective processor at each one of said service stations and connecting each processor to the receiver at that station to receive and store said fuel level information for each tank at that service station; and e) transmitting fuel level information from each said processor to a central monitoring site where data is compiled to enable the central monitoring site to do leak analysis on each tank.

11. A monitoring method as in claim 10, wherein said probe installation step includes the step of installing at least some of said micropower impulse radar probes into their respective tanks via a fill riser.

12. A monitoring method as in claim 11, said fill riser probe installation steps comprising the steps of:

a) removing any existing drop tubes from the fill riser;

b) installing a riser adapter with a cable routing opening extending through a side wall thereof on the fill riser;

c) attaching a micropower impulse radar probe with an attached wave guide to a probe hinge bracket;

d) positioning said probe hinge bracket on an L shaped cable guide, said hinge bracket securing said micropower impulse radar probe such that it is pivotable with respect to said cable guide between a substantially vertical position required for insertion through the fill riser and a substantially horizontal, operative position;

e) inserting said cable guide, hinge bracket and micropower impulse radar probe through said fill riser such that the probe and hinge bracket are positioned in said tank;

f) extending an upper angled leg of said cable bracket through said cable routing opening; and g) inserting a drop tube with an external groove extending substantially along its length into said fill riser with said groove accommodating said cable guide, said drop tube, upon insertion, engaging said hinge bracket and pivoting said hinge bracket and said micropower impulse radar probe from said substantially vertical position to said substantially horizontal position.

13. A monitoring method as in claim 10, wherein each of said processors includes a data entry device, said method further comprising the steps of:

a) inputting fuel dispensed and fuel replaced information for each tank at that service station into each processor in addition to said fuel level information; and b) periodically forwarding said fuel dispensed and fuel replaced information to said central monitoring site in addition to said fuel level information.

14. An installation system for installing a liquid level sensing micropower impulse radar probe into a liquid storage tank via a fill riser, comprising:

a) a riser adapter with a cable routing opening extending through a side wall thereof;

b) an L shaped cable guide with an upper, angled leg being insertable in said cable routing opening;

c) a probe hinge bracket adapted to mount the micropower impulse radar probe onto said cable guide such that a portion of said hinge bracket and the probe are pivotable with respect to said cable guide between a substantially vertical position required for insertion through the fill riser and a substantially horizontal, operative position within said tank; and d) a drop tube with an external groove extending substantially along its length, said external groove being sized and positioned to accommodate said cable guide as said drop tube is inserted into the fill riser.

* * * * *